United States Patent [19]

Schmidt

[11] 4,425,030
[45] Jan. 10, 1984

[54] LIQUID CRYSTAL DISPLAY COMPRISING AN ENCAPSULATION AND A LIQUID CRYSTAL DISPLAY CELL WITH POLY-PARA-XYLENE AND A METHOD OF MANUFACTURING THE SAME

[75] Inventor: Walter Schmidt, Zürich, Switzerland

[73] Assignee: Contraves AG, Zürich, Switzerland

[21] Appl. No.: 241,937

[22] Filed: Mar. 9, 1981

[30] Foreign Application Priority Data

Mar. 28, 1980 [CH] Switzerland ................ 2451/80

[51] Int. Cl.³ ............................................. G02F 1/133
[52] U.S. Cl. ............................... 350/339 R; 350/330; 428/1; 430/20
[58] Field of Search .............................. 428/1; 430/20; 350/339 R, 337, 352, 330, 334, 331 R, 340, 341; 264/272

[56] References Cited

U.S. PATENT DOCUMENTS 3,288,728  11/1966  Gorham .
3,600,216   8/1971  Stewart .
3,781,087  12/1973  Nagasaki .
3,961,843   6/1976  Nakamura et al. ................ 350/341

FOREIGN PATENT DOCUMENTS 1216255   2/1963  Fed. Rep. of Germany .
2544940   8/1977  Fed. Rep. of Germany .
2276602  11/1974  France .
2282651   3/1975  France .
 50-9458   7/1975  Japan .
54-151053 11/1979  Japan .
54-151055 11/1979  Japan .
2010529   6/1979  United Kingdom .

*Primary Examiner*—John K. Corbin
*Assistant Examiner*—David Lewis
*Attorney, Agent, or Firm*—Werner W. Kleeman

[57] ABSTRACT

A liquid crystal display and a method of fabricating the same are disclosed, comprising two substantially plane parallel transparent substrates or carriers, two polarizer foils applied to the outer faces or sides of the substrates and a liquid crystal material enclosed between the substrates. The liquid crystal display is encapsulated with a layer formed of poly-para-xylylene, 2-chloro-poly-para-xylylene or 2,2'-dichlor-poly-para-xylylene. The encapsulation is produced in accordance with the parylene method at a deposition rate $\geq 10$ Å/sec.

8 Claims, 1 Drawing Figure

LIQUID CRYSTAL DISPLAY COMPRISING AN ENCAPSULATION AND A LIQUID CRYSTAL DISPLAY CELL WITH POLY-PARA-XYLENE AND A METHOD OF MANUFACTURING THE SAME

BACKGROUND OF THE INVENTION

The present invention relates to a new and improved liquid crystal display and to a method of fabricating such liquid crystal display.

Generally speaking, the liquid crystal display of the present development is of the type composed of a liquid crystal display cell substantially comprising two plane parallel transparent substrates or carriers, two polarizer foils applied to the outer sides or faces of the substrates, and a liquid crystal material enclosed between the substrates.

For the fabrication of liquid crystal displays there is hermetically enclosed a thin layer of liquid crystal material between two glass plates which are provided with electrically conductive layers. Due to the application of a magnetic or electrical field it is possible to alter the optical properties of the liquid crystal layer. In the case of nematic liquid crystal displays polarizer foils are adhesively bounded externally at both of the glass plates, these polarizer foils passing or absorbing the incident light depending upon the state of the liquid crystal layer.

The longevity of modern liquid crystal displays is almost exclusively governed by the functional life of the polarizer foils which, due to the action of humidity, tend to bleach-out with time and detach from the glass plates. Both phenomena render the liquid crystal display unusable.

These problems have not heretofore been solved. The liquid crystal displays have not found any widespread use because of these drawbacks, particularly in military applications where they are exposed to pronounced weather conditions or rough environmental factors.

SUMMARY OF THE INVENTION

Therefore, with the foregoing in mind it is a primary object of the present invention to provide a new and improved construction of liquid crystal display which is not associated with the aforementioned drawbacks and limitations of the prior art constructions discussed above.

A further significant object of the invention aims at a method of fabricating such improved liquid crystal display.

Yet a further and more specific object of the invention is directed to an improved liquid crystal display wherein the moisture-sensitive components, such as for instance the polarizer foils and their adhesive bonds, are effectively protected against the action of moisture or humidity and aggressive substances, such as for instance acidic, basic or salt-like liquids and gases.

Now in order to implement these and still further objects of the invention, the liquid crystal display of the previously mentioned type is manifested by the features that it contains an encapsulation formed of a polymerizate of the general formula:

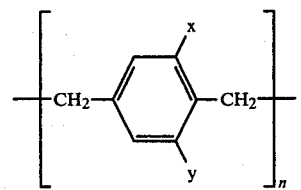

wherein the substituents X and Y are chlorine or hydrogen, and n designates the degree of polymerization.

BRIEF DESCRIPTION OF THE DRAWING

The invention will be better understood and objects other than those set forth above, will become apparent when consideration is given to the following detailed description thereof. Such description makes reference to the annexed drawing wherein FIG. 1. shows in schematic sectional view a liquid crystal display constructed according to the invention.

DETAILED DESCRIPTION OF THE PREFERRED EMBODIMENTS

Figure 1:
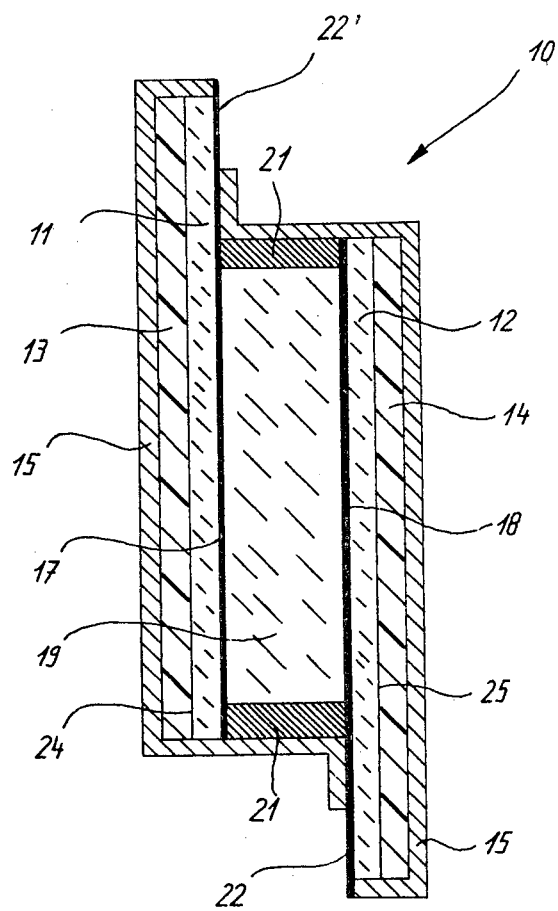

At this point it is mentioned that the inventive encapsulation of the liquid crystal display cell affords the advantage that it is exceptionally water impervious, optically isotropic and colorless. A further advantage is that the high-lustrous surfaces of the polarizer foils, following the encapsulation, appear slightly dull, resulting in an improvement of the optical appearance of the liquid crystal display since it is possible to avoid undesired reflections in this manner. Additionally, due to the coating there can be improved the angular dependency of the contrast of the liquid crystal display.

Also, the encapsulation protects the adhesive bonds or connections, usually formed of an organic adhesive, which are present between both of the substrates composed of, for instance, a sodium silicate glass. Due to the encapsulation there is rendered extremely more difficult the penetration of moisture into the liquid crystal display and the service life of the liquid crystal displays is prolonged. A moisture-tight encapsulation is important since water reacts with the surface of the sodium silicate glass, and thus, forms sodium hydroxide which weakens or tends to dissolve the adhesive bond.

The advantage of the inventive encapsulation or encapsulating means will be explained based upon tests carried out at the laboratory of the assignee firm to whom this invention has been assigned.

Commercially available liquid crystal displays, without any encapsulation, were stored at 95 percent relative humidity and a temperature of 80° C. After 10 minutes the displays were examined. The polarizer foils were already partially detached and markedly bleached. After 20 minutes the polarizer foils already could be easily pulled off.

Liquid crystal displays of the same type were encapsulated in accordance with the invention and thereafter subjected to the above-described test conditions. Even after 20 hours there could not be discerned any disadvantageous changes in the liquid crystal displays.

The inventive method for fabricating such liquid crystal displays is manifested by the features that the deposition rate is greater than 10 Å/sec.

The inventive method has the advantage that randomly formed liquid crystal displays can be covered with a uniform thick layer which, additionally, possesses essentially no pores.

At this point reference now will be made to FIG. 1 showing on an enlarged scale and in sectional illustration a liquid crystal display 10 constructed according to the invention. The liquid crystalline or crystal layer 19 is enclosed by both of the planar substrates or carriers 11 and 12 and by the marginal seal means 21. The substrates 11 and 12 normally consist of a sodium silicate glass and are covered with electrically conductive layers 17 and 18 with which contact is made from the outside by the contact locations 22 and 22', respectively. The marginal seal or seal means 21 possesses at least one opening which has not particularly been shown, through which there is introduced the liquid crystal material into the free space. This opening is then sealed with metallic solder or an adhesive agent, which usually is of the type such as an epoxy resin. At the substrates 11 and 12 there are adhesively bonded from the outside both of the polarizer foils 13 and 14 with any suitable adhesive agent or substance which forms the layers 24 and 25. Such foils are commercially available as adhesive foils. The liquid crystal display cell thus formed is provided with an encapsulation or encapsulation means 15 consisting of a thin layer of unsubstituted or 2-mono or 2,2'-dichlor-substituted poly-para-xylylenes, which in each case possess a degree of polymerization $n \geq 5000$, and which are commercially known as "Parylene N", "Parylene C" and "Parylene D" and correspond to the following formula:

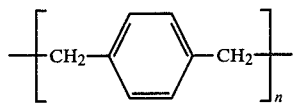

Parylene N

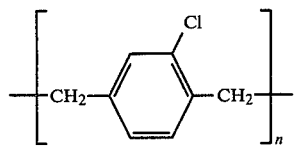

Parylene C

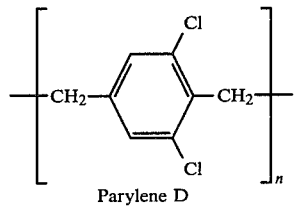

Parylene D

The encapsulation with parylene is accomplished in known manner in an installation essentially composed of a vaporization furnace, a pyrolysis chamber and a coating chamber, according to the following chemical reaction:

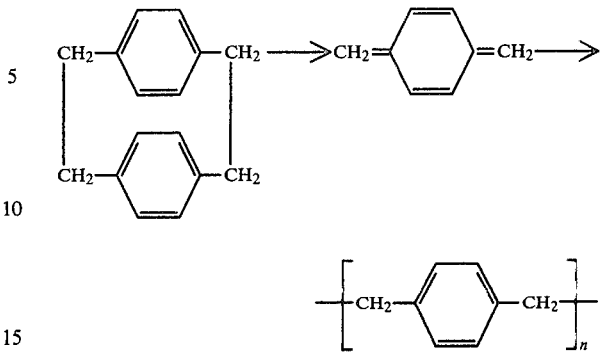

Parylene N

Useful as the educt is di-para-xylylene which is vaporized at approximately 175° C. and a pressure of 1 Torr (1 mm Hg pressure) and is converted by pyrolysis, at approximately 680° C. and 0.5 Torr into the reactive vaporous monomer para-xylylene. The monomer vapor continuously and uniformly polymerizes, at a pressure of 0.1 Torr at the liquid crystal display 10 which is at room temperature. The product parylene N is highly crystalline and possesses a polymerization degree n which is greater than 5000. Further details may be had by referring to U.S. Pat. No. 3,288,728 and U.S. Pat. No. 3,342,754.

To provide for good visibility of the display and also for an advantageous angular dependency of the contrast of the display the transparency of the encapsulation is of decisive importance. It has been found that optimum optical conditions can be obtained with a dull encapsulation. Further, it was discovered that such optimum transparency can be obtained when using a deposition rate which is greater than 10 Å/sec. Furthermore, the layer thickness of the encapsulation 15 may be for instance essentially not smaller than 0.001 mm and not greater than about 0.15 mm.

While there are shown and described present preferred embodiments of the invention, it is to be distinctly understood that the invention is not limited thereto, but may be otherwise variously embodied and practiced within the scope of the following claims.

ACCORDINGLY,

What I claim is:

1. A liquid crystal display comprising two substantially plane parallel transparent substrates, two polarizer foils applied to external faces of the substrates, marginal seal means connecting said substrates to define a space therebetween, and a liquid crystal material enclosed within said space between said substrates and said marginal seal means, and an encapsulation comprising a polymerizate of the general formula:

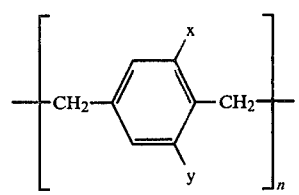

wherein each X and Y are substituents independently selected from the group consisting of chlorine and hydrogen, and n designates the degree of polymerization.

2. The polymerizate as defined in claim 1, wherein: one of the substituents is chlorine and the other substituent is hydrogen.

3. A method of manufacturing a liquid crystal display from an encapsulating means and a liquid crystal display cell, said liquid display cell containing two substantially plane parallel thin layer substrates, two polarizer foils applied to outer sides of the substrates, and a liquid crystal material enclosed between said substrates, which method comprises the steps of:

encapsulating the liquid crystal display cell by an encapsulating means composed of a polymerizate of the general formula:

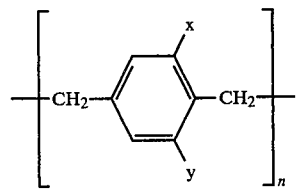

wherein each X and Y are substituents independently selected from the group consisting of chlorine and hydrogen, and n designates the degree of polymerization; and the deposition rate of the polymerizate is greater than 10 Å/sec.

4. A liquid crystal display comprising:
a liquid crystal display cell containing:
two substantially plane parallel transparent substrates;
two polarizer foils applied to external faces of said substrates;
marginal seal means connecting said substrates to define a space therebetween; and
a liquid crystal material enclosed within said space between said substrates and said marginal seal means;
encapsulation means enclosing at least said polarizer foils and said marginal seal means; and
said encapsulation means being formed of a polymerizate of the general formula:

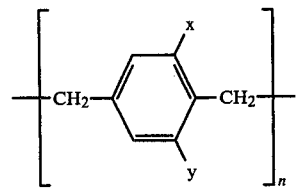

wherein each X and Y are substituents independently selected from the group consisting of chlorine and hydrogen, and n designates the degree of polymerization.

5. The liquid crystal display as defined in claim 4, wherein:
one of the substituents is chlorine and the other substituent is hydrogen.

6. The liquid crystal display as defined in claim 4, wherein:
said encapsulation means has a layer thickness which essentially is not less than about 0.001 mm and not greater than about 0.15 mm.

7. The liquid crystal display as defined in claim 4, wherein:
the degree of polymerization $n \geq 5000$.

8. A method of manufacturing a liquid crystal display from an encapsulating means and a liquid crystal display cell comprising two substantially plane parallel transparent substrates, two polarizer foils applied to external faces of said substrates, marginal seal means connecting said substrates to define a space therebetween, and a liquid crystal material enclosed within said space between said substrates and said marginal seal means, said method comprising the steps of:

encapsulating at least said polarizer foils and said marginal seal means by an encapsulating means composed of a polymerizate of the general formula:

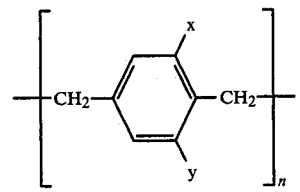

wherein each X and Y are substituents independently selected from the group consisting of chlorine and hydrogen, and n designates the degree of polymerization; and
depositing the polymerizate at a deposition rate greater than 10 Å/sec.

* * * * *